United States Patent
Aoki et al.

(10) Patent No.: US 6,939,480 B2
(45) Date of Patent: Sep. 6, 2005

(54) PLASMA DISPLAY DEVICE

(75) Inventors: Masaki Aoki, Osaka (JP); Mitsuhiro Otani, Osaka (JP); Hiroyuki Kawamura, Osaka (JP); Kazuhiko Sugimoto, Kyoto (JP); Junichi Hibino, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 48 days.

(21) Appl. No.: 10/468,727

(22) PCT Filed: Oct. 23, 2002

(86) PCT No.: PCT/JP02/10990

§ 371 (c)(1),
(2), (4) Date: Aug. 22, 2003

(87) PCT Pub. No.: WO03/036675

PCT Pub. Date: May 1, 2003

(65) Prior Publication Data

US 2004/0080271 A1 Apr. 29, 2004

(30) Foreign Application Priority Data

Oct. 23, 2001 (JP) .......... 2001-324745
Oct. 23, 2001 (JP) .......... 2001-324746

(51) Int. Cl.⁷ .......... C09K 11/59
(52) U.S. Cl. .......... 252/301.4 F; 252/301.4 R
(58) Field of Search .......... 252/301.4 F; 313/582, 313/584, 486

(56) References Cited

U.S. PATENT DOCUMENTS

| | | | |
|---|---|---|---|
| 5,951,350 A | * 9/1999 | Aoki et al. | 445/24 |
| 6,100,633 A | * 8/2000 | Okumura et al. | 313/486 |
| 6,802,990 B2 | * 10/2004 | Toda et al. | 252/301.4 F |
| 2003/0111643 A1 | * 6/2003 | Ono et al. | 252/301.4 F |

FOREIGN PATENT DOCUMENTS

| | | |
|---|---|---|
| JP | 58-168683 | 10/1983 |
| JP | 64-6087 | 1/1989 |
| JP | 1-272689 | 10/1989 |
| JP | 9-291279 | 11/1997 |
| JP | 11-293239 | 10/1999 |
| JP | 2000-129255 | 5/2000 |
| WO | 01/29147 | 4/2001 |

OTHER PUBLICATIONS

Edited by Phosphor Research Society, "Keikotai Handbook", published by Ohmsha, Ltd., Dec. 25, 1987, pp. 222 to 223.

* cited by examiner

Primary Examiner—C. Melissa Koslow
(74) Attorney, Agent, or Firm—Wenderoth, Lind & Ponack, L.L.P.

(57) ABSTRACT

Disclosed is a plasma display device that provides high luminance and minimal degradation in luminance under panel operations. A blue phosphor in a phosphor layer has a crystal structure of $MeMgSi_2O_6$:Eu or $Me_3MgSi_2O_8$:Eu (where, Me contains at least one of Ca, Sr, and Ba) produced with a precursor that is obtained by any one of methods: an aqueous solution synthesis method, a spray synthesis method, a hydrothermal synthesis method, and a hydrolysis method. The phosphor has an average particle diameter ranging from 0.1 to 3.0 μm.

3 Claims, 5 Drawing Sheets

List of the Reference Marks in the Drawings
100: PDP
101: front glass substrate
103: display electrodes
104: display scan electrodes
105: dielectric glass
106: MgO protective layer
107: address electrodes
108: dielectric glass layer
109: barrier ribs
110R: phosphor layer (Red)
110G: phosphor layer (Green)
110B: phosphor layer (Blue)
122: discharge space

PLASMA DISPLAY DEVICE

TECHNICAL FIELD

The present invention relates to a plasma display device for displaying images on a television or other equipment.

BACKGROUND ART

In color display devices employed for image display on computers or TVs, a plasma display device having a plasma display panel (hereinafter referred to as a PDP) has recently received considerable attention as a color display device with large sized screen but lightweight body due to its low-profile structure.

A PDP displays images in full color by performing an additive color process on red, green, and blue—known as the three primary colors. To realize the full color display, the PDP has phosphor layers that are respectively prepared for emitting red (R), green (G), and blue (B) of the three fundamental colors. A phosphor layer is formed of phosphor particles. The phosphor particles are excited by ultraviolet rays generated in a discharge cell in the PDP, so that visible lights of red, green, and blue are produced.

As the well-known chemical compounds for the phosphors above are: $(Y,Gd)BO_3:Eu^{3+}$, $Y_2O_3:Eu^{3+}$ for emitting red; $Zn_2SiO_4:Mn^{2+}$ for emitting green; and $BaMgAl_{10}O_{17}:Eu^{2+}$, $CaMgSi_2O_6:Eu$ for emitting blue. Each phosphor is manufactured through solid phase reaction; after mixed predetermined material, it is baked at high temperature beyond 1000° C. (for example, see *Phosphor Handbook*, pp 219 and 225, *Ohmsha*). Because the baking process sinters the phosphor particles, they should be crushed to a proper size before using: an average particle diameter of 2–5 μm for the red, and the green phosphors, 3–10 μm for the blue phosphor.

The prior-art phosphors above, however, have a problem—particularly in the blue phosphor formed of $BaMgAl_{10}O_{17}:Eu$, phosphor luminance decreases in the heating step of the phosphor layer-forming process or under panel operation. Employing the crystal structure of $CaMgSi_2O_6:Eu$ system as the blue phosphor can slightly improve the phosphor luminance in the heating step of the phosphor layer-forming process or in panel operation; however, the manufacturing method and the crystal structure by the conventional solid phase reaction has been facing the problem of low luminance—especially under panel operation, serious degradation in luminance occurs. The inconvenience comes from the fact that the blue emitting phosphor with the crystal structure of $CaMgSi_2O_6:Eu$ is easy to undergo sintering, due to its low melting point, in the solid phase reaction. Therefore, there is no way, without crushing, to obtain a blue phosphor particle having the diameter less than 8 μm. In the solid phase reaction, the crystal of $CaMgSi_2O_6:Eu$ as the phosphor should preferably be sintered at temperatures around 1400° C.; however, such a high temperature accelerates particle growth, allowing each particle to have a particle diameter of several ten μm. When the structure with a large particle diameter due to the sintering is crushed to obtain a particle diameter less than 3 μm, a structural defect developed in the crystal seriously impairs the luminance. The problem above has been an obstacle to realizing an improved panel having high luminance and minimizing luminance degradation under panel operation. The problem above also shortens the lifetime of the panel.

The present invention addresses the inconvenience above. It is therefore the object to obtain the blue emitting phosphor with high luminance. Also, it is another object to provide a panel that can minimize degradation in luminance.

DISCLOSURE OF THE INVENTION

To achieve the aforementioned object, the plasma display device of the present invention has a structurally improved blue-emitting phosphor having an average particle diameter ranging from 0.1 to 3.0 μm. And more specifically, the phosphor for blue emission has a structure of $MeMgSi_2O_6:Eu$ or $Me_3MgSi_2O_8:Eu$ (where, Me is a mixture of at least one of Ca, Sr, and Ba) produced with a precursor that is obtained by any one of the following methods: an aqueous solution reaction synthesis method, a spray synthesis method, a hydrothermal synthesis method, and a hydrolysis method.

DETAILED DESCRIPTION OF CARRYING OUT OF THE INVENTION

An exemplary embodiment of the plasma display device according to the present invention is described hereinafter with reference to the accompanying drawings.

Figure 1:
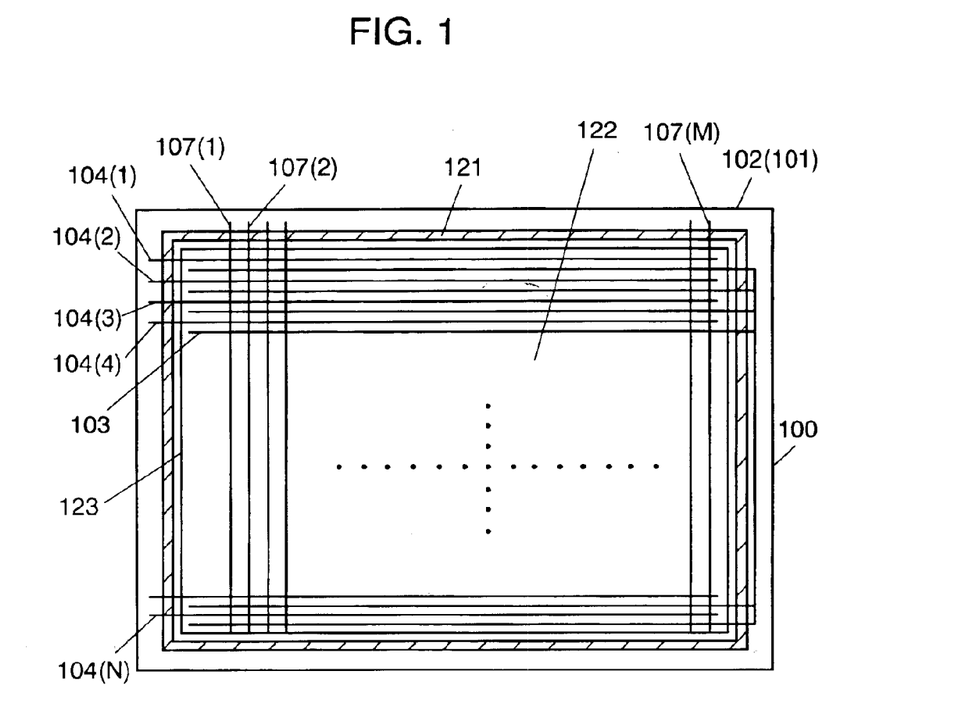
FIG. 1 is a plan view of a plasma display panel, with a front glass substrate removed, in accordance with an embodiment of the present invention.
Figure 2:
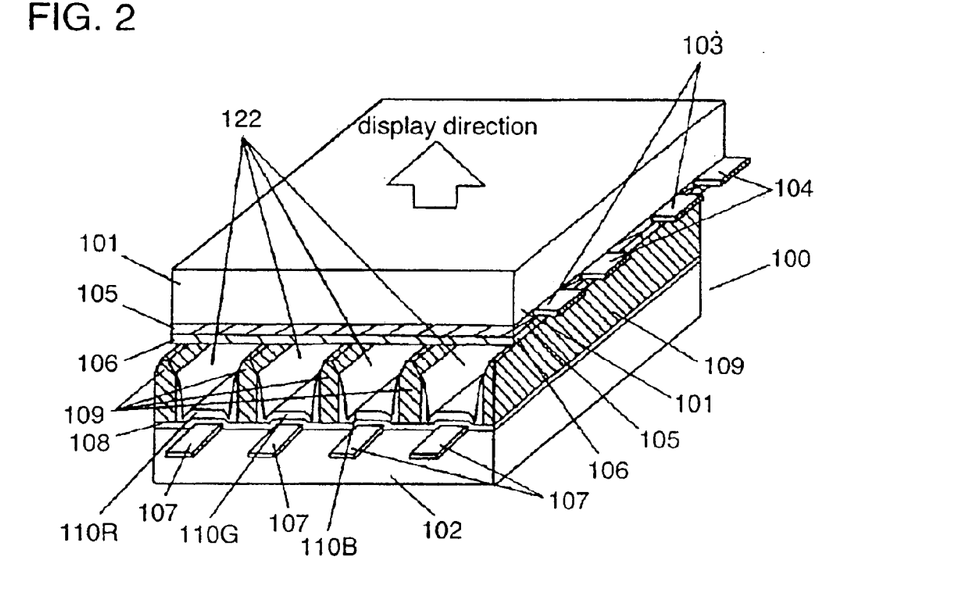
FIG. 2 is a perspective view illustrating the structure of the image display area of the plasma display panel of the embodiment.

FIG. 1 is a schematic plan view of a plasma display panel (PDP), with a front glass substrate removed, in accordance with an embodiment of the present invention. FIG. 2 is a perspective view of the PDP, showing a part of an image display area in section. In FIG. 1, the number of display electrodes, display scan electrodes, and address electrodes is reduced for sake of clarity.

In FIG. 1, PDP 100 contains front glass substrate 101 (not shown), rear glass substrate 102, N display electrodes 103, N display scan electrodes 104 (where a parenthesized N indicates the Nth electrode), M address electrode 107 (where a parenthesized M indicates the Mth electrode), and hermetic seal layer 121. The PDP has an electrode matrix having a three-electrode structure made of respective electrodes 103, 104, and 107. Cells are formed at the respective intersections of display scan electrodes 104 and address electrodes 107. Reference numeral 123 indicates an image display area.

PDP 100 has, as shown in FIG. 2, front glass substrate 101, and rear glass substrate 102 facing to substrate 101. The two substrates form discharge space 122 therebetween, which is filled with a discharge gas. On a principle surface of front glass substrate 101, display electrodes 103, display scan electrodes 104, dielectric glass layer 105, and MgO protective layer 106 are disposed. On the other hand, disposed on a principle surface of rear glass substrate 102 are address electrodes 107, dielectric glass layer 108, barrier ribs 109, and phosphor layers 110 (R, G, B). Such structured PDP is connected to a driver circuit to form a plasma display device.

Figure 3:
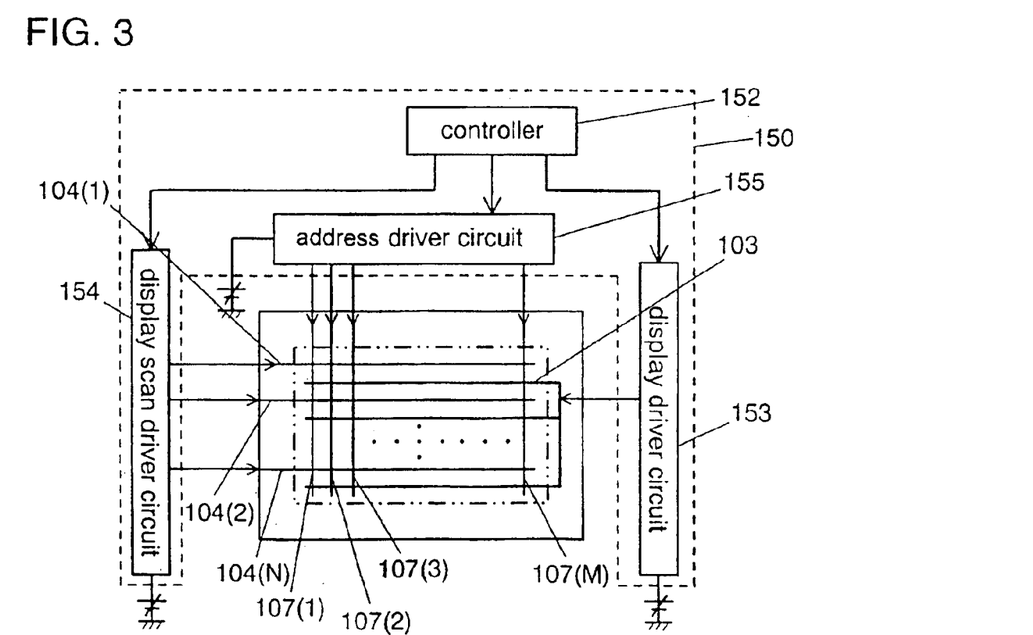
FIG. 3 is a block diagram of the plasma display device of the embodiment.

When an image is displayed on the plasma display device, first, display driver circuit 153, display scan driver circuit 154, and address driver circuit 155—the three circuits form driver circuit 150—are connected to PDP 100, as shown in FIG. 3. Next, according to the control of controller 152, a voltage is applied across display scan electrode 104 and address electrode 107 of a cell to be lit for address discharge therebetween. Then, a pulse voltage is applied across display electrode 103 and display scan electrode 104 for sustain discharge. The sustain discharge generates ultraviolet light in the cell. The phosphor layers excited by the ultraviolet light emit light, thereby lighting the cell. In this way, combination of lit and unlit cells of the respective colors produces an image on the display.

Now will be described a method of manufacturing the aforementioned PDP with reference to FIGS. 1 and 2.

First, N display electrodes 103 and N display scan electrodes 104 are arranged on front glass substrate 101 alternately, parallel to each other, like stripes. (In FIG. 2, only two of respective electrodes are shown for simplicity.) Thereafter, the electrodes are covered with dielectric glass layer 105, and further over which, MgO protective layer 106 is formed.

Display electrodes 103 and display scan electrodes 104 are made of silver. These electrodes are formed by applying a silver paste for electrodes by screen printing and then baking the paste.

Dielectric glass layer 105 is formed by applying a paste containing lead glass material by screen printing, and baking the paste at a predetermined temperature for a predetermined period of time (e.g. at 560° C. for 20 min.) to obtain a desired thickness (approx. 20 $\mu$m). As for the paste containing lead glass material, a mixture of PbO (70 wt %), $B_2O_3$ (15 wt %), $SiO_2$ (10 wt %), $Al_2O_3$ (5 wt %) and an organic binder ($\alpha$-terpineol containing 10% of ethyl cellulose dissolved therein) is often used. The aforementioned organic binder contains a resin dissolved in an organic solvent. Acrylic resin can be used as a resin other than the ethyl cellulose, and n-butylcarbitol as an organic solvent. Further, a dispersant—for, example, glyceryl trileate—can be mixed into such an organic binder.

MgO protective layer 106 is made of magnesium oxide (MgO). The layer is formed into a predetermined thickness (approx. 0.5 $\mu$m) by sputtering or chemical vapor deposition (CVD) method.

Now, the explanation turns to the rear panel. First, M address electrodes 107 are formed in lines on rear glass substrate 102 by screen printing a silver paste and then baking the paste. Next, dielectric glass layer 108 is formed by applying a paste containing lead glass material to the address electrodes by a screen printing. Further, barrier ribs 109 are formed by repeatedly applying the same paste containing lead glass material to the dielectric glass layer at a predetermined pitch by screen printing and thereafter baking the paste. These barrier ribs 109 divide, in the direction of the lines, discharge space 122 into respective cells (i.e., unit emission area).

Figure 4:
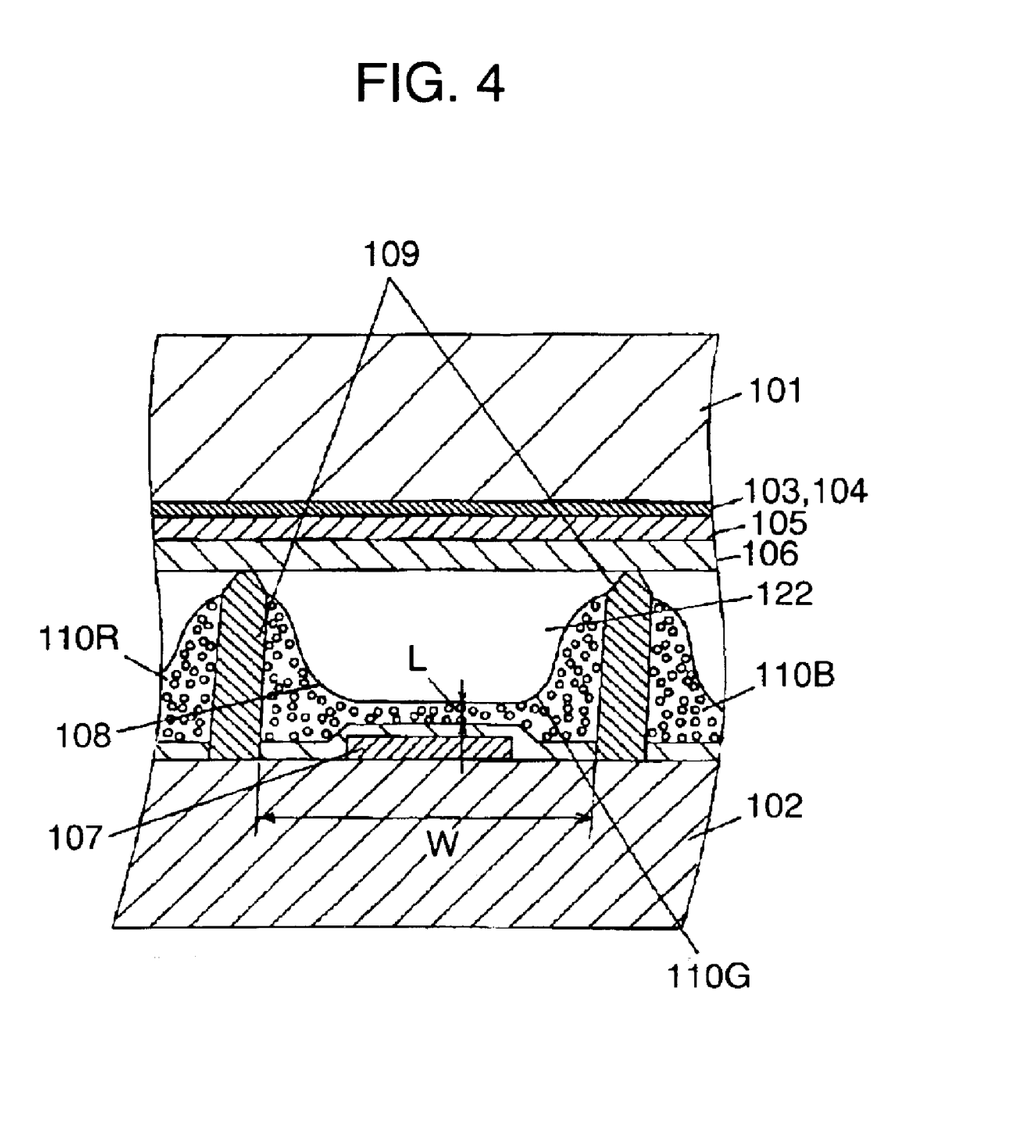
FIG. 4 is a sectional view illustrating the structure of the image display area of the plasma display panel of the embodiment.

FIG. 4 is a partially sectional view of PDP 100. As shown in FIG. 4, interval dimension W between barrier ribs 109 is determined to a value ranging from approx. 130 to 240 $\mu$m, according to a high definition television (HD-TV) screen having a diagonal size ranging from 32 to 50 in.

Red (R) and green (G) phosphor particles are prepared by a hydrothermal synthesis method, and blue (B) phosphor particles are prepared by a hydrothermal synthesis method, atomization synthesis method, or hydrolysis method. Paste-like phosphor ink made of red (R), green (G), or blue (B) phosphor particles and an organic binder is applied to grooves between barrier ribs 109, and baked at temperatures ranging from 400 to 590° C. to burn out the organic binder. As a result, phosphor layers 110—in which phosphor particles of corresponding colors are bound with each other—are formed.

It is preferable that thickness L in the direction of lamination of phosphor layers 110 on address electrode 107 is approx. 8 to 25 times the average diameter of phosphor particles of each color. That is, in order to constantly achieve a certain luminance (emission efficiency) when a phosphor layer is irradiated with an amount of ultraviolet light, the phosphor layer needs to absorb ultraviolet light generated in the discharged space, not allowing to pass therethrough. For this purpose, it is desirable that the phosphor layer has a thickness formed of at least eight layered-, preferably, approx. 20 layered-phosphor particles. Having a thickness beyond 20-layered lamination almost "saturates" emission efficiency—this is because sufficiently large discharge space 122 cannot be ensured due to the thickened layer. Phosphor particles having preferably small diameters and spherical shapes, like those obtained by hydrothermal synthesis, atomization synthesis, hydrolysis methods, have a packing factor of the phosphor layer and a total surface area of the phosphor particles larger than those of phosphor particles having non-spherical shapes, even when the number of laminated layers are the same. As a result, phosphor particles having spherical shapes increase the surface area contributing to actual light emission of the phosphor layer, thereby enhancing the emission efficiency. The synthesis method of phosphor layers 110 and the phosphor particles employed for the phosphor layers will be described later.

The front panel and the rear panel produced in this manner are placed one on the other so that the respective electrodes on the front panel are orthogonal to the address electrodes on the rear panel. Sealing glass is inserted between the panels along the periphery thereof and baked, for example, at temperatures of approx. 450° C. for 10 to 20 min. to form hermetical seal layer 121 for sealing. Next, discharge space 122 is once evacuated to a high vacuum (e.g. $1.1 \times 10^{-4}$ Pa) and filled with a discharge gas, namely, He—Xe or Ne—Xe inert gas, at a predetermined pressure, to complete PDP 100.

Figure 5:
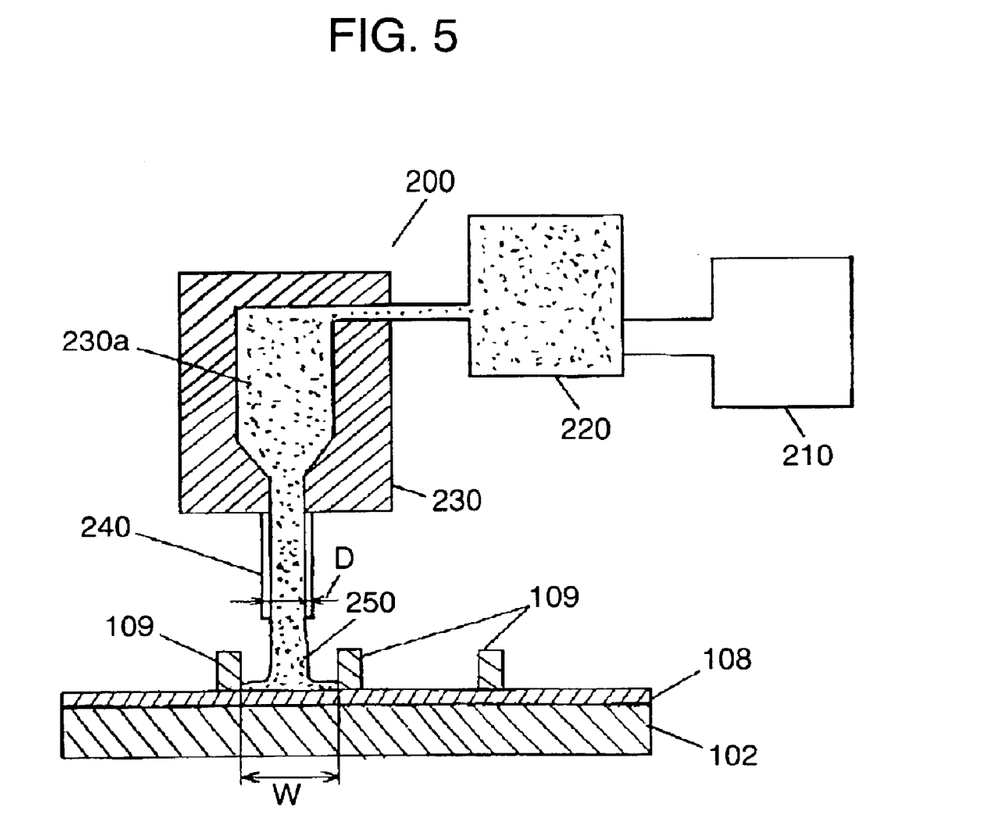
FIG. 5 is a schematic view illustrating the structure of an ink applying device, which is used in a phosphor layer-forming process in the present invention.

FIG. 5 is a schematic diagram showing the structure of an ink dispenser used in forming phosphor layers 110. As shown in FIG. 5, ink dispenser 200 includes server 210, pressure pump 220, and header 230. Phosphor ink is pressurized by pressure pump 220 and supplied from server 210, which stores the phosphor ink, to header 230. Header 230 contains ink chamber 230a and nozzle 240. The phosphor ink, which was fed to ink chamber 230a with application of pressure, is continuously ejected from nozzle 240. It is desirable that bore diameter D of nozzle 240 is sized at least 30 $\mu$m to prevent clogging of the nozzle. It is also desirable that bore diameter D is equal to or smaller than interval W between barrier ribs 109 (approx. 130 to 200 $\mu$m) to properly apply the ink to the groove between the barrier ribs. Hence, bore diameter D is usually determined to 30 to 130 $\mu$m.

Header 230 is structured to be driven linearly by a header scanning mechanism (not shown). Continuously ejecting phosphor ink 250 from nozzle 240 while scanning header 230 allows phosphor ink to be uniformly applied to the grooves between baffler ribs 109 on rear glass substrate 102. Viscosity of the phosphor ink is kept within the range of 1500 to 30000 centipoises (CP) at a temperature of 25° C.

This server 210 also has a mixer (not shown). Mixing prevents precipitation of particles in phosphor ink. Header 230 is integrally formed with ink chamber 230a and nozzle 240 by performing machining and electric discharge machining on a metallic material.

For the reader's convenience, the following is a list of the reference numbers which are set forth in the figures together with their definition according to the foregoing description:
100: PDP
101: front glass substrate
102: rear glass substrate
103: display electrodes
104: display scan electrodes
105: dielectric glass
106: MgO protective layer
107: address electrodes
108: dielectric glass layer
109: barrier ribs
110R: phosphor layer (Red)
110G: phosphor layer (Green)
110B: phosphor layer (Blue)
122: discharge space
200: ink dispenser
210: server
220: pressure pump
230: header
230a: ink chamber
240: nozzle
250: phosphor ink Forming phosphor layers is not limited to the aforementioned method; other various kinds of methods, such as photolithography, screen printing, and a method of disposing a film including phosphor particles mixed therein, can be employed.

The phosphor ink is prepared by mixing phosphor particles with each color, a binder, and a solvent so that the mixture has a viscosity ranging 1,500 to 30,000 centipoises (CP). A surface active agent, silica, a dispersant in amount of 0.1 to 5 wt % can also be added, as required.

As a red phosphor included in this phosphor ink, a compound represented by $(Y, Gd)_{1-x}BO_3:Eu_x$ or $Y_{2-x}O_3:Eu_x$ is used. In these compounds, the element Eu substitutes for a part of the element Y constituting the matrix of the compounds. It is preferable that the substitution value X of the element Eu with respect to the element Y is $0.05 \leq X \leq 0.20$. Having X larger than 0.20 invites serious degradation in luminance in spite of achieving a high luminance. For this reason, such a red phosphor is unlikely to be practical. On the other hand, having X smaller than 0.05 lowers the composition ratio of Eu mainly emitting light, accordingly decreasing the luminance. The phosphor with decreased luminance can no longer serve as a phosphor.

As a green phosphor, a compound represented by $Ba_{1-x}Al_{12}O_{19}:Mn_x$ or $Zn_{2-x}SiO_4:Mn_x$ is used. $Ba_{1-x}Al_{12}O_{19}:Mn_x$ is a compound in which the element Mn substitutes for a part of the element Ba constituting the matrix of the compound. $Zn_{2-x}SiO_4:Mn_x$ is a compound in which the element Mn substitutes for a part of the element Zn constituting the matrix of the compound. For the same reason as described in the case of the red phosphor, it is preferable that the substitution value X of the element Mn with respect to the element Ba or Zn is $0.01 \leq X \leq 0.10$.

As a blue phosphor, a compound represented by $Me_{1-x}MgSi_2O_6:Eu_x$ or $Me_{3(1-x)}MgSi_2O_8:Eu_x$—where, Me is a mixture of at least one of Ca, Sr, and Ba— is used. $Me_{1-x}MgSi_2O_6:Eu_x$ and $Me_{3(1-x)}MgSi_2O_8:Eu_x$ are compounds in which the element Eu substitutes for a part of the element Me(Ca, Sr, Ba) constituting the matrix of the compounds. Again for the same reason described in the red, and the green phosphors, the substitution value X of the element Eu with respect to the element Me should preferably be $0.03 \leq X \leq 0.2$.

The each phosphor described above is a phosphor (with no grinding process), which is manufactured with a precursor obtained through an aqueous solution reaction method, hydrothermal synthesis method, atomization baking method, or hydrolysis method. These methods of manufacturing phosphors will be explained later.

Ethyl cellulose or acrylic resin can be used as a binder included in phosphor ink (in an amount of 0.1 to 10 wt % of the ink). α-terpineol or n-butylcarbitol can be used as a solvent. Polymers, such as PMA and PVA, can also be used as a binder. As for solvent, organic solvent, such as diethyleneglycol and methyl ether, can also be used.

According to the embodiment, first, a precursor for a phosphor is prepared in an aqueous solution. With the precursor, the embodiment employs a hydrothermal synthesis method, atomization synthesis method, hydrolysis method to manufacture a phosphor particle. Hereinafter will be described an example of the manufacturing methods. The aforementioned method is a synthesis and crystal growth method, which provides spherical phosphor particles.

(1) Blue Phosphor

Here will be described $Ca_{1-x}MgSi_2O_6:Eu_x$, which is known as a blue phosphor. In a mixed solution fabrication process, materials of the phosphor, i.e., barium nitrate [Ba(NO$_3$)$_2$], magnesium nitrate [Mg(NO$_3$)$_3$], silicon oxide [SiO$_2$]—colloidal silica, and europium nitrate [Eu(NO$_3$)$_2$] are mixed in a molar ratio of Ba(NO$_3$)$_2$:Mg(NO$_3$)$_3$:SiO$_2$:Eu(NO$_3$)$_2$=1−X:1:2:X ($0.03 \leq X \leq 0.20$). This mixture is dissolved in an aqueous medium to prepare a mixed solution. Ion-exchange water or pure water is preferably used for the aqueous medium by virtue of its containing no impurities; however, an aqueous medium containing non-aqueous solvent (e.g. methanol and ethanol) can also be used.

Next, an alkaline (basic) solution, such as potassium hydrate, is added to the hydrate mixed solution prepared above to produce a hydrate (i.e., a precursor) having spherical particles. The hydrate is put into a container made of a corrosion- and heat-resistant material, such as gold and platinum. Then, the hydrate is hydra-thermally synthesized in a high pressure vessel, using equipment capable of heating and pressurizing at the same time, such as an autoclave, at specified temperatures (100 to 300° C.) under specified pressures (0.2 to 10 MPa). In this case, an aluminum powder or a graphite powder is used as a reducer for the blue phosphor. The hydrothermal synthesis is thus carried out for 12 to 20 hours to obtain a spherical precursor.

Other than the aforementioned method with the use of autoclave pressure, a spray synthesis method can be used. In this case, the hydrate mixed solution is directly fed from the pressure nozzle; the solution is ultrasonically sprayed into a furnace heated at temperatures ranging from 1000 to 1500° C. to obtain the spherical precursor.

Next, the obtained precursor powder is baked in a reducing atmosphere containing 5% of hydrogen and 95% of nitrogen, for example, at a specified temperature for a specified period of time (e.g. at 800 to 1400° C. for two hours). Thereafter, the baked powders are classified to provide a desired blue phosphor, $Ca_{1-x}MgSi_2O_6:Eu_x$.

The phosphor particles obtained by the hydrothermal synthesis or the atomization synthesis have a spherical shape and an average particle diameter ranging from 0.05 to 3.0 μm, which is smaller than that of particles fabricated by the conventional solid phase reaction method. The wording "spherical shape" used here is defined so that the aspect ratios (minor axis diameter/major axis diameter) of most of the phosphor particles range, for example, from 0.9 to 1.0; however, not all the phosphor particles need to be within the range.

Now will be described the phosphor of $(Sr, Ca)_{1-x}MgSi_2O_6:Eu_x$. The phosphor differs from aforementioned $Ca_{1-x}MgSi_2O_6:Eu_x$ only in that the element Sr substitutes for a part of the element Ca of $Ca_{1-x}MgSi_2O_6:Eu_x$ (where, the ratio of Sr to Ca is 0.1–1 to 0–1). The materials used are described hereinafter.

First, the materials, i.e., strontium nitrate $[Sr(NO_3)_2]$, magnesium nitrate $[Mg(NO_3)_3]$, silicon oxide $[SiO_2]$—colloidal silica, europium nitrate $[(NO_3)_2]$ are mixed with water so as to have the molar ratio of 1–X:1:2:X ($0.03 \leq X \leq 0.20$). Next, the mixture, together with an alkaline (basic) solution, is put into a container with the application of ultrasonic waves and $O_2$—, (or $O_3$—) bubbling to make a spherical hydrate(precursor hydrate). After being baked in the air at temperatures 800 to 1,450° C., the hydrate is further baked at 1000 to 1400° C. in a reducing atmosphere, and then the particles are classified. Through the processes above, the aqueous solution reaction method can provide a desired blue phosphor.

Next will be described another method of producing $(Ca, Ba)_{1-x}MgSi_2O_6:Eu_x$.

First, the materials, i.e., calcium alkoxide $[Ca(O.R)_2]$, barium alkoxide $[Ba(O.R)_2]$, where, the ratio of Ca to Ba is 0–1 to 1–1, silicon alkoxide $[Si(O.R)_4]$, europium alkoxide $[Eu(O.R)_3]$— where, R belongs to an alkyl group, are mixed so as to have the molar ratio of 1–X:1:2:X ($0.03 \leq X \leq 0.2$). Next, the mixture is hydrolyzed by the addition of water or alcohol to obtain a spherical precursor. The precursor is baked at temperatures ranging from 1000 to 1400° C. Next, the obtained particles are baked in a reducing atmosphere, for example, containing 5% of hydrogen and 95% of nitrogen, at a specified temperature for a specified period of time (e.g. at 1000 to 1400° C. for two hours). Thereafter, using an air classifier, the particles are classified to obtain a blue phosphor. In this way, the hydrolysis method can also provide a blue phosphor.

Next will be described a phosphor of $Ba_{3(1-x)}MgSi_2O_8:Eu_x$.

In a mixed solution fabrication process, materials, i.e., barium nitrate $[Ba(NO_3)_2]$, magnesium nitrate $[Mg(NO_3)_3]$, silicon oxide $[SiO_2]$—colloidal silica, and europium nitrate $[Eu(NO_3)_2]$ are mixed in a molar ratio of $Ba(NO_3)_2:Mg(NO_3)_3:SiO_2:Eu(NO_3)_2=3(1-X):1:2:X$ ($0.003 \leq X \leq 0.20$). This mixture is dissolved in an aqueous medium to prepare a mixed solution. As for the aqueous medium, ion-exchange water or pure water is preferably used by virtue of its containing no impurities; however, an aqueous medium containing non-aqueous solvent (e.g. methanol and ethanol) can also be used.

Next, add an alkaline (basic) solution, such as potassium hydrate, to the hydrate mixed solution prepared above to produce a hydrate(precursor) having spherical particles. After that, put the hydrate into a container made of a corrosion- and heat-resistant material, such as gold and platinum. Then, the hydrate is hydro-thermally synthesized in a high pressure vessel, using equipment capable of heating and pressurizing at the same time, such as an autoclave, at specified temperatures (100 to 300° C.) under specified pressures (0.2 to 10 MPa). In this case, an aluminum powder or a graphite powder is used as a reducer for the blue phosphor. The hydrothermal synthesis is thus carried out for 12 to 20 hours to obtain a spherical precursor.

Other than the aforementioned method with the use of autoclave pressure, a spray synthesis method can be used. In this case, the hydrate mixed solution is directly fed from the pressure nozzle; the solution is ultrasonically sprayed into a furnace heated at temperatures ranging from 1000 to 1500° C. to obtain the spherical precursor.

Next, the obtained precursor powder is baked in a reducing atmosphere containing 5% of hydrogen and 95% of nitrogen, for example, at a specified temperature for a specified period of time (e.g. at 800 to 1400° C. for two hours). Thereafter, the baked powders are classified to provide a desired blue phosphor, $Ba_{3(1-x)}MgSi_2O_8:Eu_x$.

The phosphor particles obtained by the hydrothermal synthesis or the atomization synthesis have a spherical shape and an average particle diameter ranging from 0.05 to 3.0 μm, which is smaller than that of particles fabricated by the conventional solid phase reaction method. The wording "spherical shape" used here is defined so that the aspect ratios (minor axis diameter/major axis diameter) of most of the phosphor particles range, for example, from 0.9 to 1.0; however, not all the phosphor particles need to have the range.

Now will be described a phosphor of $(Ba, Sr)_{3(1-x)}MgSi_2O_8:Eu_x$. The phosphor differs from aforementioned $Ba_{3(1-x)}MgSi_2O_8:Eu_x$ in only that the element Sr substitutes for a part of the element Ba of $Ba_{3(1-x)}MgSi_2O_8:Eu_x$ (where, the ratio of Ba to Sr is 0.1–1 to 0–1). The materials used are described hereinafter.

First, the materials, i.e., strontium nitrate $[Sr(NO_3)_2]$, barium nitrate $[Ba(NO_3)_2]$, magnesium nitrate $[Mg(NO_3)_3]$, silicon oxide $[SiO_2]$—colloidal silica, europium nitrate $[(NO_3)_2]$ are mixed with water so as to have the molar ratio of 3(1–X):1:2:X ($0.003 \leq X \leq 0.20$). Next, the mixture, together with an alkaline (basic) solution, is put into a container with the application of ultrasonic waves and $O_2$—(or $O_3$—) bubbling to make a spherical hydrate(precursor hydrate). After being baked in the air at temperatures 800 to 1450° C., the hydrate is further baked at 1000 to 1400° C. in a reducing atmosphere, and then the particles are classified. Through the processes above, the aqueous solution reaction method can provide a desired blue phosphor.

Next will be described another method of producing $(Ca, Ba)_{1-x}MgSi_2O_6:Eu_x$.

First, the materials, i.e., calcium alkoxide $[Ca(O.R)_2]$, barium alkoxide $[Ba(O.R)_2]$, where, the ratio of Ca to Ba is 0–1 to 1–1, silicon alkoxide $[Si(O.R)_4]$, europium alkoxide $[Eu(O.R)_3]$—where, R belongs to an alkyl group, are mixed so as to have the molar ratio of 3(1–X):1:2:X ($0.003 \leq X \leq 0.2$). Next, the mixture is hydrolyzed by the addition of water or alcohol to obtain a spherical precursor. The precursor is baked at temperatures ranging from 1000 to 1400° C. Next, the obtained particles are further baked in a reducing atmosphere containing, for example, 5% of hydrogen and 95% of nitrogen, at a specified temperature for a specified period of time (e.g. at 1000 to 1400° C. for two hours). Thereafter, using an air classifier, the particles are classified to obtain a blue phosphor. In this way, the hydrolysis method can also provide a blue phosphor.

(2) Green Phosphor

First, a phosphor of $Zn_{2(1-x)}SiO_4:Mn_x$ is described. In a mixed solution fabrication process, materials, i.e., zinc nitrate $[Zn(NO_3)]$, colloidal silica $[SiO_2]$, and manganese nitrate $[Mn(NO_3)_2]$ are mixed in a molar ratio of $Zn(NO_3):SiO_2:Mn(NO_3)_2=2-X:1:X$ ($0.01 \leq X \leq 0.10$). This mixture is dissolved in ion-exchange water to prepare a mixed solution. Next, in a hydrate producing process, add alkaline solution (e.g. ammonia aqueous solution) is added to the mixed solution to prepare a hydrate.

Thereafter, in a hydrothermal synthesis process, the hydrate and the ion-exchange water are put into a capsule made of a corrosion- and heat-resistant material, such as gold and platinum. Then, the capsule containing the mixed solution is put into a high-pressure vessel to undergo hydrothermal synthesis. The hydrothermal synthesis process goes on for 2 to 10 hours at specified temperatures (100 to 300° C.) under specified pressures (0.2 to 10 MPa), for example, with autoclave pressure being applied. The hydro-thermally synthesized particles are dried to obtain a desired phosphor of $Zn_{2(1-x)}SiO_4:Mn_x$. The phosphor particle obtained by hydrothermal synthesis has a spherical shape and an average particle diameter ranging from approx. 0.1 to 2.0 μm. The phosphor particles are annealed in the air at temperatures ranging from 800 to 1100° C. and then classified. The green phosphor powder is thus obtained.

Next will be described a phosphor of $Ba_{1-x}Al_{12}O_{19}:Mn_x$. In a mixed solution fabrication process, materials, i.e., barium nitrate [$Ba(NO_3)_2$], aluminum nitrate [$Al(NO_3)_2$], and manganese nitrate [$Mn(NO_3)_2$] are mixed in a molar ratio of $Ba(No_3):Al(NO_3)_2:Mn(NO_3)_2=1-X:12:X$ ($0.01 \leq X \leq 0.10$). This mixture is dissolved in ion-exchange water to prepare a mixed solution.

Next, in a hydrate producing process, alkaline solution (e.g. ammonia aqueous solution) is dropped into the mixed solution to prepare a hydrate. Thereafter, in a hydrothermal synthesis process, the hydrate and the ion-exchange water are put into a capsule made of a corrosion- and heat-resistant material, such as gold and platinum. Then, the capsule containing the mixed solution is put into a high-pressure vessel to undergo hydrothermal synthesis. The hydrothermal synthesis process goes on for 2 to 20 hours at specified temperatures (100 to 300° C.) under specified pressures (0.2 to 10 MPa), for example, with autoclave pressure being applied.

The hydro-thermally synthesized particles are dried to obtain a desired phosphor of $Ba_{1-x}Al_{12}O_{19}:Mn_x$. The phosphor particle obtained by hydrothermal synthesis has a spherical shape and an average particle diameter ranging from approx. 0.1 to 2.0 μm. The phosphor particles are annealed in the air at temperatures ranging from 800 to 1100° C. and then classified. The green phosphor powder is thus obtained.

(3) Red Phosphor

First, a phosphor of $(Y, Gd)_{1-x}BO_3:Eu_x$ is described.

In a mixed solution fabrication process, materials, i.e., yttrium hydroxide [$Y_2(OH)_3$], gadolinium hydroxide [$Gd_2(OH)_3$], boric acid [$H_3BO_3$], and europium hydroxide [$Eu_2(OH)_3$] are mixed in a molar ratio of [$Y_2(OH)_3, Gd_2(OH)_3$]:$H_3BO_3$:$Eu_2(OH)_3=1-X:2:X$ ($0.05 \leq X \leq 0.20$), having a 65 to 35 Y to Gd ratio. The mixture is dissolved in ion-exchange water to prepare a mixed solution. Next, in a hydration process, an aqueous base, such as ammonia aqueous solution, is added to the mixed solution to provide a hydrate.

After that, in a hydrothermal synthesis process, the hydrate and the ion-exchange water are put into a container made of a corrosion- and heat-resistant material, such as gold and platinum. Then, the container having the mixed solution is put into a high-pressure vessel to undergo hydrothermal synthesis. The hydrothermal synthesis takes place for 3 to 12 hours at specified temperatures (100 to 300° C.) under specified pressures (0.2 to 10 MPa), for example, with autoclave pressure being applied. The phosphor particle obtained by hydrothermal synthesis has a spherical shape and an average particle diameter ranging from approx. 0.1 to 2.0 μm. The phosphor is heated for two hours in the air at temperatures ranging from 800 to 1200° C. and then classified. A red phosphor is thus obtained.

Next, a description of $Y_{2-x}O_3:Eu_x$ is provided. In a mixed solution fabrication process, materials, i.e., yttrium nitrate [$Y_2(NO_3)_2$] and europium nitrate [$Eu(NO_3)_2$] are mixed in a molar ratio of $Y_2(NO_3)_2:Eu(NO_3)_2=2-X:X$ ($0.05 \leq X \leq 0.30$). The mixture is dissolved in ion-exchange water to prepare a mixed solution. Next, in a hydration process, an aqueous base, such as ammonia aqueous solution, is added to the mixed solution to provide a hydrate.

After that, in a hydrothermal synthesis process, the hydrate and the ion-exchange water are put into a container made of a corrosion- and heat-resistant material, such as gold and platinum. Then, the container having the mixed solution is put into a high-pressure vessel to undergo hydrothermal synthesis. The hydrothermal synthesis takes place for 3 to 12 hours at specified temperatures (100 to 300° C.) under specified pressures (0.2 to 10 MPa), for example, with the application of autoclave pressure. The compound obtained by hydrothermal synthesis is dried to obtain a desired phosphor of $Y_{2-x}O_3:Eu_x$.

Next, the phosphor particles are annealed in the air at temperatures ranging from 800 to 1200° C. and then classified. The red phosphor powder is thus obtained. The phosphor obtained by the hydrothermal synthesis process has a spherical shape and particle diameters ranging from approx. 0.1 to 2.0 μm. Such a shape and a size are suitable for forming a phosphor layer that exhibits excellent light emission characteristics.

The phosphor particles described in (1) through (3) are produced by a hydrothermal synthesis method, atomization synthesis method, or hydrolysis method, using a spherical precursor prepared in an aqueous solution. This is why a particle has a spherical shape and a small average particle diameter (of approx. 0.1 to 2.0 μm). The phosphor obtained through the synthesis method above has no oxygen vacancy on its surface of the particle, whereby not only luminance of the phosphor but also luminance degradation is significantly improved. Besides, ultraviolet light penetrates not so far from the surface of the phosphor particle: approx. several hundreds nm. That is, emission occurs almost at the surface. Considering that fact, 2.0 μm or smaller particle diameter increases the surface area of a particle contributing to emission. This allows the phosphor layers to maintain high luminance.

As another advantage, the phosphor particle produced through the synthesis methods above sustains crystal growth with the spherical shape kept, so that the particle has fewer structural defects including the oxygen vacancy. Accordingly, ultraviolet light absorbed in the oxygen vacancy decreases, on the other hand, excitation at a mainly emitting element easily occurs. In addition, the spherical shape of the particle contributes to avoid each particle from sticking together in the baking process at high temperatures, whereby the particle can be easily crushed. The particle with fewer oxygen vacancy can not only provide high luminance, but also minimize luminance degradation caused by the oxygen vacancy. The phosphor of the present invention can have a particle diameter on the order of sub-microns, thereby minimizing inconsistencies in coating when the phosphor is applied. In addition, a packing factor of the phosphor forming a phosphor layer increases; accordingly, the PDP of the present invention has a higher luminance than that of a conventional one.

In the description above, hydro-thermally synthesized phosphor particles are employed for all the phosphor layers, which are responsible for red and green emission. An aqueous solution reaction method or atomization synthesis method can provide red-, and green-phosphor layers almost the same as those obtained by the hydrothermal synthesis method.

Among the three colors of R, G, and B, especially the conventional blue phosphor of $CaMgSi_2O_6$:Eu has a lower luminance and noticeable luminance degradation in the discharge. The inconvenience has contributed to decrease in the color temperature of white when the cells of three colors emit light at the same time. For this reason, in a PDP, the color temperature of white display has been improved, using circuits, by inefficiently decreasing the luminance of other phosphor cells (responsible for red and green emission) in line with the luminance of the blue emitting cells. However, using the blue phosphor produced by the methods of the present invention, namely, the blue phosphor having the crystal structure of $MeMgSi_2O_6$:Eu or $Me_3Si_2O_8$:Eu (where, Me is formed of at least one of Ca, Sr, and Ba) can increase the luminance of the blue emitting cells. This eliminates the need of intentionally decreasing the luminance of the cells of other colors.

Thus, the cells of all the colors no longer have an inefficient decrease in luminance. That is, making full use of the luminance of each cell can improve luminance as a whole of a PDP, with the color temperature of white display highly maintained. Furthermore, the blue phosphor of the present invention can be applied to fluorescent lighting that is excited by ultraviolet light to emit light in a similar manner. Instead of the conventional blue phosphor applied to the inner wall of a fluorescent tube, the blue phosphor obtained by the methods of the invention: an aqueous solution reaction method; a hydrothermal synthesis method; and a spray synthesis method, can be employed for the tube. This replacement can provide fluorescent lighting with improvement in luminance and luminance degradation.

Evaluation Experiment 1

In order to evaluate the performance of a plasma display device of the present invention, samples based on the aforementioned embodiment were produced to carry out performance evaluation tests. The experimental results are described below.

Each of the plasma display devices produced has a diagonal size of 42 in.—for a high definition (HD) TV screen having a rib-pitch of 150 µm. Each of the PDP was produced so that the dielectric glass layer was 20 µm thick; the MgO protective layer was 0.5 µm thick; and the distance between the display electrode and the display scan electrode was 0.08 mm. The discharge space was filled with a discharge gas in which 5% of xenon gas was mixed with neon as the major component. The discharge gas was sealed in the discharge space with the application of specified discharging gas pressure of, for example, 73 kPa.

For all the phosphor particles used for PDPs of samples 1 through 9, a spherical-shaped precursor, which was prepared in an aqueous solution, was employed. Each phosphor was produced with the spherical precursor that was obtained through an aqueous solution reaction method, a hydrothermal synthesis method, a spray synthesis method, or hydrolysis method. Table 1 shows each data for synthesis of the samples.

TABLE 1

| Sample No. | Blue Phosphor [$Me_{1-x}MgSi_2O_6$:$Eu_x$] | | | | Red Phosphor [$(Y,Gd)_{1-x}BO_3$:$Eu_x$] | | Green Phosphor [$(Zn_{1-x}Mn_x)_2SiO_4$] | |
|---|---|---|---|---|---|---|---|---|
| | Amount of Eu X | Manufacturing method | Material for Me | Ca/Sr/Ba ratio | Amount of Eu X | Manufacturing method | Amount of Eu X | Manufacturing method |
| 1 | 0.03 | Hydrothermal synthesis method | Ca | 1.0 | 0.1 | Hydrothermal synthesis method | 0.01 | Hydrothermal synthesis method |
| 2 | 0.05 | Hydrolysis method | Ca/Sr | 1/0.1 | 0.2 | Hydrothermal synthesis method | 0.02 | Hydrothermal synthesis method |
| 3 | 0.1 | Spray method | Ca/Ba | 1/0.1 | 0.3 | Hydrothermal synthesis method | 0.05 | Hydrothermal synthesis method |
| 4 | 0.2 | Aqueous solution reaction method | Ca/Ba | 1/0.5 | 0.15 | Hydrothermal synthesis method | 0.1 | Hydrothermal synthesis method |

| Sample No. | Blue Phosphor [$Me_{1-x}MgSi_2O_6$:$Eu_x$] | | | | Red Phosphor [$(Y_{1-x})_2BO_3$:$Eu_x$] | | Green Phosphor [$Ba_{1-x}Al_{12}O_{19}$:$Mn_x$] | |
|---|---|---|---|---|---|---|---|---|
| 5 | 0.03 | Aqueous solution reaction method | Ca/Ba | 1/0.5 | 0.01 | Hydrothermal synthesis method | 0.01 | Hydrothermal synthesis method |
| 6 | 0.1 | Hydrothermal synthesis method | Ca/Sr/Ba | 1/1/1 | 0.1 | Hydrothermal synthesis method | 0.02 | Hydrothermal synthesis method |
| 7 | 0.1 | Spray method | Sr | 1.0 | 0.15 | Hydrothermal synthesis method | 0.05 | Hydrothermal synthesis method |
| 8 | 0.2 | Hydrolysis method | Ba | 1.0 | 0.2 | Hydrothermal synthesis method | 0.1 | Hydrothermal synthesis method |
| 9 | 0.2 | Hydrolysis method | Sr/Ca | 1/0.5 | 0.2 | Hydrothermal synthesis method | 0.1 | Hydrothermal synthesis method |

TABLE 1-continued

| | | | | | | | | |
|---|---|---|---|---|---|---|---|---|
| 10* | 0.1 | Solid-phase reaction method | Ca | 1.0 | 0.15 | Hydrothermal synthesis method | 0.01 | Hydrothermal synthesis method |
| 11* | BaMgAl$_{10}$O$_{17}$:Eu | Solid-phase reaction method Eu$_{0.1}$ | — | — | 0.15 | Hydrothermal synthesis method | 0.01 | Hydrothermal synthesis method |

*Sample Nos. 10 and 11 show comparative samples

Samples 1 through 4 are similarly structured so as to have a combination of red phosphor of $(Y, Gd)_{1-x}BO_3:Eu_x$, the green phosphor of $Zn_{2-x}SiO_4:Mn_x$, and the blue phosphor of $Me_{1-x}MgSi_2O_6:Eu_x$ (where, Me is a combination of Ca, Sr, and Ba). As shown in Table, 1 these samples differ from each other in: manufacturing methods of the phosphor, the substitution ratios of Eu and Mn that serve as a main emitter, i.e., the substitution ratios of Eu to the elements Y and Me, the substitution ratios of Mn to the element Zn, and a structural combination of Me.

Samples 5 through 9 are similarly structured so as to have a combination of red phosphor of $Y_{2-x}O_3:Eu_x$, the green phosphor of $Ba_{1-x}Al_{12}O_{19}:Mn_x$, and the blue phosphor of $Me_{1-x}MgSi_2O_6:Eu_x$ (where, Me is a combination of Ca, Sr, and Ba). As is the case of samples 1 through 4, the phosphors of these samples are manufactured by different way: a hydrothermal synthesis method, a spray synthesis method, and a hydrolysis method. The substitution ratios of the mainly emitting element, and the structural combination of Me are changed as shown in Table 1. In addition, phosphor ink used for forming phosphor layers is prepared by using each kind of phosphor particles shown in Table 1, and mixing the phosphor, resin, solvent and dispersant, with the mixing ratio shown in the aforementioned description.

Samples 10 and 11 are comparative examples. In the two examples, the red phosphor of $(Y, Gd)_{1-x}BO_3:Eu_2$, and the green phosphor of $Zn_2SiO_4:Mn_x$ are commonly manufactured by the hydrothermal synthesis method. Samples 10 and 11 have differently structured blue phosphor; sample 10 employs the blue phosphor of $CaMgSi_2O_6:Eu$ obtained by the solid-phase reaction method, while sample 11 employs the blue phosphor of $BaMgAl_{10}O_{17}:Eu$, which is also produced by the solid-phase reaction method. With such structured samples 10 and 11, each phosphor layer is formed under the conditions similar to samples 1 through 9.

According to the measurement results, viscosity of each kind of the phosphor ink (at 25° C.) is kept within the range of 1500 to 30000 CP. Observations on each phosphor layer found that the phosphor ink is uniformly applied to the side faces of the barrier ribs. As for the phosphor particles used for phosphor layers of each color, the structures and the manufacturing methods shown in Table 1 are used in each sample.

As for the blue phosphor particles for samples 10 and 11, phosphor particles undergo the solid phase reaction through the conventional sintering process. With a ball grinder, the sintered phosphor particles are crushed then classified to obtain the blue phosphor particles. The red phosphor for samples 10 and 11 has the structure and the manufacturing method the same as those of sample 9: hydro-thermally synthesized $Y_2O_3:Eu$ (see Table 3). The particle has a spherical shape and 2.0-$\mu$m particle diameter. Using the particles, a red phosphor layer formed has a film thickness of 20 $\mu$m. The green phosphor for samples 10, 11 also has the structure and the manufacturing method the same as those of sample 9: hydro-thermally synthesized $Ba_{1-x}Al_{12}O_{19}:Mn_x$. The particles obtained have 2.2-$\mu$m particle diameter, but are differently sized. Using the particles, a green phosphor layer formed has a film thickness of 20 $\mu$m. As for the blue phosphor, conventionally sintered $CaMgSi_2O_6:Eu$ is baked at 1400° C. in a $H_2$—$N_2$ gas. After 5-hour baking, the particles are crushed then classified so as to obtain a particle diameter of 4.0 $\mu$m.

Phosphor ink used for forming phosphor layers was prepared by using each kind of phosphor particle shown in Table 1, and mixing the phosphor, resin, solvent and dispersant.

Measurements in some stages in manufacturing PDP were performed on samples 1 through 9 and comparative samples 10, 11. These are: the luminance degradation factor of each phosphor when the phosphor is baked (at 520° C. in the air) in the rear panel manufacturing process; the luminance degradation factor of each phosphor in the panel sealing process with the application of heat at 450° C.; the luminance degradation factor in a lifetime-accelerated test; the presence or absence of addressing failure at address discharge; and the luminance when all the blue emitting cells turn ON.

To measure the luminance of the PDP, discharge sustain pulses at a voltage of 150V and at a frequency of 30 kHz were applied to the panel.

The evaluation on the luminance degradation factor was carried out as follows. Discharge sustain pulses at a voltage of 200V and at a frequency of 100 kHz were applied to each sample PDP continuously for 100 hours, and luminance of each PDP was measured before and after the application of the pulses. Based on the measurements, the luminance degradation factor was derived from the expression of ((luminance after pulse-application−luminance before pulse-application)/luminance before pulse-application) *100.

Addressing failure at address discharge was determined by existence of flickers in an image. If a sample PDP has flickers in any one position, the PDP was judged as having flickers. As for the luminance distribution of each PDP, luminance at white display was measured with a luminance meter, the distribution on the entire surface was shown.

Listed in Table 2 are the results on luminance and the luminance degradation factors of each color. In the experiment, the discharge was uniformly applied to each phosphor layer. The luminance suppressing of red and green cells to control the color temperature of white display was not carried out.

TABLE 2

| Sample No. | Luminance degradation factor (%) of phosphor baked (520° C.) in rear panel manufacturing process | | | Luminance degradation factor (%) of phosphor when panels are sealed (450° C.) in panel sealing process | | | Luminance degradation factor (%) of phosphor after the application of discharge sustain pulses (200 V, 100 kHz) for 100 hrs. | | | Addressing failure at address discharge | Luminance at blue display on the entire surface (cd/cm$^2$) |
|---|---|---|---|---|---|---|---|---|---|---|---|
| | Blue | Red | Green | Blue | Red | Green | Blue | Red | Green | | |
| 1 | −2.8 | −1.6 | −4.5 | −5.0 | −2.4 | −12.8 | −0.9 | −5.0 | −14.0 | None | 81 |
| 2 | −1.2 | −1.4 | −4.2 | −1.3 | −2.1 | −13.1 | −0.6 | −4.4 | −14.8 | None | 84.6 |
| 3 | −1.2 | −1.8 | −4.5 | −1.4 | −2.2 | −13.0 | −0.7 | −4.3 | −14.2 | None | 87 |
| 4 | −0.5 | −1.3 | −4.6 | −1.3 | −2.4 | −12.8 | −0.5 | −4.2 | −14.3 | None | 88.1 |
| 5 | −0.4 | −1.5 | −4.9 | −0.4 | −2.1 | −13.1 | −0.3 | −4.3 | −14.8 | None | 88.8 |
| 6 | −0.2 | −1.2 | −4.4 | −0.3 | −2.3 | −12.8 | −0.2 | −4.1 | −14.9 | None | 91.5 |
| 7 | −1.4 | −1.4 | −4.8 | −1.1 | −2.4 | −12.6 | −0.5 | −4.3 | −14.6 | None | 91 |
| 8 | −1.3 | −1.3 | −4.4 | −1.5 | −2.6 | −12.9 | −0.5 | −4.8 | −15.1 | None | 88.7 |
| 9 | −0.4 | −1.5 | −4.1 | −1.2 | −2.4 | −12.9 | −0.7 | −4.4 | −15.6 | None | 92.6 |
| 10* | −4.6 | −1.3 | −4.2 | −14.5 | −2.3 | −13.0 | −11.0 | −4.2 | −14.4 | Exist | 61 |
| 11* | −5.6 | −1.5 | −4.1 | −21.8 | −2.4 | −13.2 | −34.6 | −4.1 | −15.6 | Exist | 46 |

*Sample Nos. 10 and 11 show comparative samples

As shown in Table 2, in comparative samples 10 and 11, the luminance degradation factors of the conventional blue phosphor baked at 520° C. are −4.6% (sample 10) and −5.6% (sample 11); the luminance degradation factors in the panel sealing process (at 450° C.) are −14.5% (sample 10) and −21.8% (sample 11); and the luminance changes after application of the discharge sustain pulse for 100 hours are −11.0% (sample 10) and −34.6% (sample 11). Addressing failure was observed in both samples. As for luminance of the blue color of the PDP, samples 10 and 11 had data resulted in 61 cd/cm$^2$, 46 cd/cm$^2$, respectively.

On the other hand, in samples 1 through 9, which employ the blue phosphor formed of $Me_{1-x}MgSi_2O_6:Eu_x$, the luminance with all the blue emitting cells turned ON exceeded 80 cd/cm$^2$ for all the samples. Furthermore, the luminance degradation factors in the phosphor-baking process (at 520° C.) ranged from −0.2% to −2.8%; the luminance degradation factors in the panel sealing process (at 450° C.) ranged from −0.3% to −0.5%; and the luminance changes after application of the discharge sustain pulse for 100 hours achieved −0.2 to −0.9% range. No addressing failure was observed.

It is apparent from the results that the PDP device of the present invention is superior to comparative samples 10 and 11 in the luminance of a panel, the luminance degradation factors in the manufacturing processes, and addressing failure of the discharge.

This is because the blue phosphor particle of the present invention has a crystal structure of $Me_{1-x}MgSi_2O_6:Eu_x$ (where, Me is formed of at least one of Ca, Sr, and Ba) processed by an aqueous solution reaction synthesis method, a hydrothermal synthesis method, a spray synthesis method, or a hydrolysis method. With the crystal structure and the synthesis methods above, a phosphor particle with a relatively small (ranging from 0.1 to 3.0 μm) size and a generally spherical shape is obtained. Such a small, spherical particle has no need to be crushed, and can suppress undesired oxygen vacancy. At the same time, the packing factor of the phosphor particles in a phosphor layer increases, accordingly, the surface area of the phosphor particles that contribute to emission increases. A panel having a blue phosphor in which the amount of Ca is partly or completely replaced with a mixture of Ca and Ba can provide a noticeable improvement in luminance and characteristics rather than a panel having a blue phosphor that consists of Ca.

As described above, the occurrence of the oxygen vacancy is suppressed in the blue phosphor particles, which prevents the phosphor particle from low crystal growth that develops from where the oxygen vacancy occurs. The low occurrence of the oxygen vacancy noticeably contributes to suppressing degradation in the color temperature of blue and the luminance. At the same time, the lower the occurrence of the oxygen vacancy is, the lower the amount of ultraviolet light is absorbed into the oxygen vacancy. This fact encourages excitation of an element that mainly emits light, providing improved luminance higher than the conventional blue phosphor.

Evaluation Experiment 2

In experiment 1, the phosphors of the present invention were used for PDPs. Samples of fluorescent lighting using the phosphor of the present invention were prepared for fluorescent lighting that is excited by ultraviolet light to emit light in a similar manner.

To provide fluorescent lighting sample 12, phosphors of each color produced under the condition of sample 4 in Table 1 were mixed and the mixture was applied to the inner wall of a glass tube, as a phosphor layer of known fluorescent lighting. As a comparative example thereof, phosphors of each color produced by a conventional solid phase reaction method under the condition of sample 11 (in Table 1) were also mixed and the mixture was applied to form a phosphor layer. Fluorescent lighting comparative sample 13 was thus prepared.

An evaluation performed on the aforementioned samples 12 and 13 was carried out as follows. Pulse voltage of 100V–60 Hz was applied to each sample for 5000 hours, and luminance of each sample was measured before and after the application of the pulse voltage. Based on the measurements, the luminance degradation factor was derived from the expression of ((luminance after pulse-application−luminance before pulse-application)/luminance before pulse-application)*100. Table 3 shows the results.

TABLE 3

| Sample No. | Phosphor | Luminance (cd/m$^2$) | Luminance degradation after 5000 hours (100 V, 60 Hz) |
|---|---|---|---|
| 12 | Phosphor of Sample No. 7 | 6880 | −0.30% |
| 13* | Phosphor of Sample No. 11 | 6600 | −14.6% |

*Sample No. 13 shows comparative samples

Compared to fluorescent lighting sample 13, as shown in Table 3, fluorescent lighting sample 12—which employs the blue phosphor particle with a $Me_{1-x}MgSi_2O_6:Eu_x$—structure produced by, for example, a spray synthesis method, a hydrothermal synthesis method, or a hydrolysis method, using a spherical precursor obtained in an aqueous solution—not only has approx. 4% of improvement in luminance, but also can desirably attenuate luminance degradation.

Evaluation Experiment 3

Next, another evaluation experiment was carried out on a plasma display device employing the phosphor having $Me_{3(1-x)}MgSi_2O_8:Eu_x$-structure. Like aforementioned experiment 1, the evaluation was performed on samples. Table 4 shows the experiment results.

TABLE 4

| | Blue Phosphor [$Me_{3(1-x)}MgSi_2O_6:Eu_x$] | | | | Red Phosphor [$(Y,Gd)_{1-x}BO_3:Eu_x$] | | Green Phosphor [$(Zn_{1-x}Mn_x)_2SiO_4$] | |
|---|---|---|---|---|---|---|---|---|
| Sample No. | Amount of Eu X | Precursor-manufacturing method | Material for Me | Ca/Sr/Ba ratio | Amount of Eu X | Manufacturing method | Amount of Eu X | Manufacturing method |
| 1 | 0.03 | Hydrothermal synthesis method | Ba | 1.0 | 0.1 | Hydrothermal synthesis method | 0.01 | Hydrothermal synthesis method |
| 2 | 0.05 | Hydrolysis method | Ba/Sr | 1/0.1 | 0.2 | Hydrothermal synthesis method | 0.02 | Hydrothermal synthesis method |
| 3 | 0.1 | Spray method | Ba/Sr | 0.1/0.1 | 0.3 | Hydrothermal synthesis method | 0.05 | Hydrothermal synthesis method |
| 4 | 0.2 | Aqueous solution reaction method | Ba/Ca | 1/0.5 | 0.15 | Hydrothermal synthesis method | 0.1 | Hydrothermal synthesis method |
| | Blue Phosphor [$Me_{3(1-x)}MgSi_2O_8:Eu_x$] | | | | Red Phosphor [$(Y_{2-x})_2O_3:Eu_x$] | | Green Phosphor [$Ba_{1-x}Al_{12}O_{19}:Mn_x$] | |
| 5 | 0.003 | Aqueous solution reaction method | Ca/Ba | 1/0.5 | 0.01 | Hydrothermal synthesis method | 0.01 | Hydrothermal synthesis method |
| 6 | 0.1 | Hydrothermal synthesis method | Ca/Sr/Ba | 1/1/1 | 0.1 | Hydrothermal synthesis method | 0.02 | Hydrothermal synthesis method |
| 7 | 0.1 | Spray method | Sr | 1.0 | 0.15 | Hydrothermal synthesis method | 0.05 | Hydrothermal synthesis method |
| 8 | 0.2 | Hydrolysis method | Ca | 1.0 | 0.2 | Hydrothermal synthesis method | 0.1 | Hydrothermal synthesis method |
| 9 | 0.2 | Hydrolysis method | Sr/Ca | 1/0.5 | 0.2 | Hydrothermal synthesis method | 0.1 | Hydrothermal synthesis method |
| 10* | 0.1 | Solid-phase reaction method | Ba | 1.0 | 0.15 | Hydrothermal synthesis method | 0.01 | Hydrothermal synthesis method |
| 11* | 0.1 | Solid-phase reaction method | $BaMgAl_{10}O_{17}:Eu$ | — | 0.15 | Hydrothermal synthesis method | 0.01 | Hydrothermal synthesis method |
| 12* | 0.1 | Solid-phase reaction method | $CaMgSi_2O_6:Eu$ | — | 0.15 | Hydrothermal synthesis method | 0.01 | Hydrothermal synthesis method |

*Sample Nos. 10, 11 and 12 show comparative samples

Samples 1 through 4 are similarly structured so as to have a combination of red phosphor of $(Y, Gd)_{1-x}BO_3:Eu_x$, the green phosphor of $Zn_{2-x}SiO_4:Mn_x$, and the blue phosphor of $Me_{3(1-x)}MgSi_2O_8:Eu_x$ (where, Me is a combination of Ca, Sr, and Ba). As shown in Table 4, these samples differ from each other in: manufacturing methods of the phosphor, the substitution ratios of Eu and Mn that serve as a main emitter, i.e., the substitution ratios of Eu to the elements Y and Me, the substitution ratios of Mn to the element Zn, and a structural combination of Me.

Samples 5 through 9 are similarly structured so as to have a combination of red phosphor of $Y_{2-x}O_3:Eu_x$, the green phosphor of $Ba_{1-x}Al_{12}O_{19}:Mn_x$, and the blue phosphor of $Me_{3(1-x)}MgSi_2O_8:Eu_x$ (where, Me is a combination of Ca, Sr, and Ba). As is the case of samples 1 through 4, the phosphors of these samples are manufactured by different way: a hydrothermal synthesis method, a spray synthesis method, and a hydrolysis method. The substitution ratios of the mainly emitting element, and the structural combination of Me are changed as shown in Table 4. In addition, phosphor ink used for forming phosphor layers was prepared by using each kind of phosphor particle shown in Table 4, and mixing the phosphor, resin, solvent and dispersant, with the mixing ratio shown in the table.

Samples 10, 11 and 12 are comparative examples. In the three examples, the red phosphor of $(Y_{1-x})_2O_3:Eu_2$, and the green phosphor of $Ba_{1-x}Al_{12}O_{19}:Mn_x$ are manufactured by the hydrothermal synthesis method. Samples 10, 11 and 12 have differently structured blue phosphor; sample 10 employs a blue phosphor of $Ba_3MgSi_2O_8:Eu$, sample 11 employs a blue phosphor of $BaMgAl_{10}O_{17}:Eu$, and sample 12 employs a blue phosphor of $CaMgSi_2O_6:Eu$. All of which are produced by the solid phase reaction method. With such structured samples 10, 11 and 12, each phosphor layer is formed under the conditions similar to samples 1 through 9.

According to the measurement results, viscosity of each kind of the phosphor ink (at 25° C.) is kept within the range of 1500 to 30000 CP. Observations on each phosphor layer told that the phosphor ink was uniformly applied to the side faces of the barrier ribs. As for the phosphor particles used for phosphor layers of each color, the structures and the manufacturing methods shown in Table 4 are used in each sample.

As for the blue phosphor particles for samples 10, 11 and 12, the phosphor particles undergo the solid phase reaction through the conventional sintering process. With a ball grinder, the sintered phosphor particles are crushed then classified to obtain the blue phosphor particles. The red phosphor for samples 10, 11 and 12 has the structure and the manufacturing method the same as those of sample 9: hydro-thermally synthesized $Y_2O_3:Eu$. The particle has a spherical shape and 2.0-$\mu$m particle diameter. Using the particles, a red phosphor layer formed has a film thickness of 20 $\mu$m. The green phosphor for samples 10, 11, and 12 also has the structure and the manufacturing method the same as those of sample 9: hydro-thermally synthesized $Ba_{1-x}Al_{12}O_{19}:Mn_x$. The particles obtained have 2.2-$\mu$m particle diameter, but are differently sized. Using the particles, a green phosphor layer formed has a film thickness of 20 $\mu$m. As for the blue phosphor, conventionally sintered $CaMgSi_2O_6:Eu$ (for sample 10); $BaMgAl_{10}O_{17}:Eu$ (for sample 11); and $CaMgSi_2O_6:Eu$ (for sample 12) are baked at 1400° C. in a $H_2$—$N_2$ gas. After 5-hour baking, the particles are crushed then classified so as to obtain a particle diameter of 4.0 $\mu$m.

Phosphor ink used for forming phosphor layers was prepared by using each kind of phosphor particles shown in Table 4, and mixing the phosphor, resin, solvent and dispersant.

Measurements in some stages in manufacturing PDP were performed on samples 1 through 9 and comparative samples 10, 11, 12. These are: the luminance degradation factor of each phosphor when the phosphor is baked (at 520° C. in the air) in the rear panel manufacturing process; the luminance degradation factor of each phosphor in the panel sealing process with the application of heat at 450° C.; the luminance degradation factor in the lifetime-accelerated test; the presence or absence of addressing failure at address discharge; and the luminance when all the blue emitting cells turns ON.

Listed in Table 5 are the results on luminance and the luminance degradation factors of each color. In the experiment, the discharge was uniformly applied to each phosphor layer. The luminance suppressing of red and green cells to control the color temperature of white display was not carried out.

TABLE 5

| Sample No. | Luminance degradation factor (%) of phosphor baked (520° C.) in rear panel manufacturing process | | | Luminance degradation factor (%) of phosphor when panels are sealed (450° C.) in panel sealing process | | | Luminance degradation factor (%) of phosphor after the application of discharge sustain pulses (200 V, 100 kHz) for 100 hrs. | | | Addressing failure at address discharge | Luminance at blue display on the entire surface (cd/cm$^2$) |
|---|---|---|---|---|---|---|---|---|---|---|---|
| | Blue | Red | Green | Blue | Red | Green | Blue | Red | Green | | |
| 1 | −1.8 | −1.6 | −4.5 | −3.0 | −2.4 | −12.8 | −0.5 | −5.0 | −14.0 | None | 83 |
| 2 | −1.0 | −1.4 | −4.2 | −1.0 | −2.1 | −13.1 | −0.4 | −4.4 | −14.8 | None | 85.7 |
| 3 | −1.1 | −1.8 | −4.5 | −1.1 | −2.2 | −13.0 | −0.5 | −4.3 | −14.2 | None | 88.2 |
| 4 | −0.4 | −1.3 | −4.6 | −0.9 | −2.4 | −12.8 | −0.4 | −4.2 | −14.3 | None | 88.4 |
| 5 | −0.3 | −1.5 | −4.9 | −0.3 | −2.1 | −13.1 | −0.2 | −4.3 | −14.8 | None | 89 |
| 6 | −0.2 | −1.2 | −4.4 | −0.2 | −2.3 | −12.8 | −0.2 | −4.1 | −14.9 | None | 91.7 |
| 7 | −1.1 | −1.4 | −4.8 | −1.0 | −2.4 | −12.6 | −0.3 | −4.3 | −14.6 | None | 91.2 |
| 8 | −1.3 | −1.3 | −4.4 | −1.5 | −2.6 | −12.9 | −0.5 | −4.8 | −15.1 | None | 88.8 |
| 9 | −0.4 | −1.5 | −4.1 | −1.2 | −2.4 | −12.9 | −0.5 | −4.4 | −15.6 | None | 92.7 |
| 10* | −3.6 | −1.3 | −4.2 | −12.5 | −2.3 | −13.0 | −10.5 | −4.2 | −14.4 | Exist | 65 |
| 11* | −5.6 | −1.5 | −4.1 | −21.8 | −2.4 | −13.2 | −34.6 | −4.1 | −15.6 | Exist | 46 |
| 12* | −4.6 | −1.5 | −4.1 | −14.5 | −2.4 | −13.1 | −11 | −4.1 | −15.5 | Exist | 61 |

*Sample Nos. 10, 11 and 12 show comparative samples

As shown in Table 5, in comparative samples 10, 11 and 12, the luminance degradation factors of the conventional blue phosphor baked at 520° C. are −3.6% (sample 10), −5.6% (sample 11), and −4.6% (sample 12); the luminance degradation factors in the panel sealing process (at 450° C.) are −12.5% (sample 10), −21.8% (sample 11), and −14.5% (sample 12); and the luminance changes after application of the discharge sustain pulse for 100 hours are −10.5% (sample 10), −34.6% (sample 11), and −11.0% (sample 12). Addressing failure was observed in all the samples. As for luminance of the blue color of the PDP, samples 10, 11 and 12 had data resulted in 65 cd/cm$^2$, 46 cd/cm$^2$, and 61 cd/cm$^2$, respectively.

On the other hand, in samples 1 through 9, which employ the blue phosphor formed of $Me_{3(1-x)}MgSi_2O_8:Eu_x$, the luminance with all the blue emitting cells turned ON exceeded 83 cd/cm$^2$ in all the samples. Furthermore, the luminance degradation factors in the phosphor-baking process (at 520° C.) ranged from −0.2% to −1.8%; the luminance degradation factors in the panel sealing process (at 450° C.) ranged from −0.2% to −3.0%; and the luminance changes after application of the discharge sustain pulse for 100 hours achieved −0.1 to −0.5% range. No addressing failure was observed.

It is apparent from the results that the PDP device of the present invention is superior to comparative samples 10, 11 and 12 in the luminance of a panel, the luminance degradation factors in the manufacturing processes, and addressing failure of the discharge.

This is because the blue phosphor particle of the present invention has a crystal structure of $Me_{3(1-x)}MgSi_2O_8:Eu_x$ (where, Me is formed of at least one of Ca, Sr, and Ba) processed by an aqueous solution reaction synthesis method, a hydrothermal synthesis method, a spray synthesis method, or a hydrolysis method. With the crystal structure and the synthesis methods above, a phosphor particle with a relatively small (ranging from 0.1 to 3.0 μm) size and a generally spherical shape is obtained. Such a small, spherical particle has no need to be crushed, and can suppress undesired oxygen vacancy. At the same time, the packing factor of the phosphor particles in a phosphor layer increases, accordingly, the surface area of the phosphor particles that contribute to emission increases. A panel having a blue phosphor in which the amount of Ba is partly or completely replaced with a mixture of Ca and Sr can provide a noticeable improvement in luminance and characteristics rather than a panel having a blue phosphor that consists of Ba.

As described above, the occurrence of the oxygen vacancy is suppressed in the blue phosphor particles, which prevents the phosphor particle from low crystal growth that develops from where the oxygen vacancy occurs. The low occurrence of the oxygen vacancy noticeably contributes to suppressing degradation in the color temperature of blue and the luminance. At the same time, the lower the occurrence of the oxygen vacancy, the lower the amount of ultraviolet light absorbed into the oxygen vacancy. This fact encourages excitation of a mainly emitting element, providing improved luminance higher than the conventional blue phosphor.

Evaluation Experiment 4

Using the phosphor evaluated in experiment 3, samples of fluorescent lighting were prepared for fluorescent lighting, which is excited by ultraviolet light to emit light in a similar manner. As is the case with experiment 2, to provide fluorescent lighting sample 12, phosphors of each color produced under the condition of sample 4 in Table 4 were mixed and the mixture was applied to the inner wall of a glass tube, as a phosphor layer of known fluorescent lighting. As a comparative example thereof, phosphors of each color produced by a conventional solid phase reaction method under the condition of sample 11 (in Table 4) were also mixed and the mixture was applied to form a phosphor layer. Fluorescent lighting comparative sample 13 was thus prepared.

An evaluation performed on the aforementioned samples 12 and 13 was carried out as follows. Pulse voltage of 100V–60 Hz were applied to each sample for 5000 hours, and luminance of each sample was measured before and after the application of the pulse voltage. Based on the measurements, the luminance degradation factor was derived from the expression of ((luminance after pulse-application−luminance before pulse-application)/luminance before pulse-application)*100. Table 6 shows the results.

TABLE 6

| Sample No. | Phosphor | Luminance (cd/m$^2$) | Luminance degradation after 5000 hours (100 V, 60 Hz) |
|---|---|---|---|
| 12 | Phosphor of Sample No. 7 | 6885 | −0.30% |
| 13* | Phosphor of Sample No. 11 | 6600 | −14.6% |

*Sample No. 13 shows comparative samples

Compared to fluorescent lighting sample 13, as shown in Table 6, fluorescent lighting sample 12—which employs the blue phosphor particle with a $Me_{3(1-x)}MgSi_2O_8:Eu_x$—structure produced by a spray synthesis method, a hydrothermal synthesis method, or a hydrolysis method, using a spherical precursor obtained in an aqueous solution—not only has approx. 4% of improvement in luminance, but also can desirably attenuate luminance degradation.

Industrial Applicability

According to the present invention, as described above, the blue phosphor particles have a structure formed of $Me_{1-x}MgSi_2O_6:Eu_x$, or $Me_{3(1-x)}MgSi_2O_8:Eu_x$ (where, Me contains at least one of Ca, Sr, and Ba), which is produced by an aqueous solution reaction method, a hydrothermal synthesis method, or a spray synthesis method. Employing the blue phosphor for a phosphor layer can enhance the absorption of ultraviolet light in the phosphor layer, thereby increasing luminance, the lifetime, and reliability of a plasma display device and a lighting device including a lamp.

List of the Reference Marks in the Drawings

100: PDP
101: front glass substrate
102: rear glass substrate
103: display electrodes
104: display scan electrodes
105: dielectric glass
106: MgO protective layer
107: address electrodes
108: dielectric glass layer
109: barrier ribs
110R: phosphor layer (Red)
110G: phosphor layer (Green)
110B: phosphor layer (Blue)
122: discharge space

What is claimed is:

1. A method of manufacturing a phosphor of any one of $MeMgSi_2O_6:Eu$ and $Me_3MgSi_2O_8:Eu$ wherein Me comprises at least one of Ca, Sr, and Ba with an average diameter ranging from 0.1, to 3.0 µm, the method comprising:

preparing a mixed solution by mixing a material and an aqueous medium;

preparing a hydrate by mixing the mixed solution and an alkaline base;

preparing a precursor by performing a hydrothermal synthesis reaction on a solution containing the hydrate and water therein at temperatures ranging from 100 to 300° C. under pressures ranging from 0.2 to 10 MPa; and baking the precursor at temperatures ranging from 800 to 1400° C. in a reducing atmosphere.

2. A method of manufacturing a phosphor of any one of $MeMgSi_2O_6$:Eu and $Me_3MgSi_2O_8$:Eu wherein Me comprises at least one of Ca, Sr, and Ba with an average diameter ranging from 0.1 to 3.0 µm, the method comprising:

preparing a mixed solution by mixing a material and an aqueous medium;

preparing a hydrate by putting the mixed solution and an alkaline base into a container and then simultaneously applying ultrasonic wave and $O_2$—(or $O_3$—)bubbling to the container to obtain good mixture;

drying the hydrate and then baking the hydrate in an air at temperatures ranging from 800 to 1250° C.; and baking the hydrate in a reducing atmosphere at temperatures ranging from 1000 to 1400° C.

3. A method of manufacturing a phosphor of any one of $MeMgSi_2O_6$:Eu and $Me_3MgSi_2O_8$:Eu wherein Me comprises at least one of Ca, Sr, and Ba with an average diameter ranging from 0.1 to 3.0 µm, the method comprising:

mixing alkoxide that contains Ca, Ba, Sr, Si, Mg, and Eu, with an aqueous medium;

preparing a precursor hydrate for a blue phosphor by mixing the mixed solution with a simultaneous application of ultrasonic wave and $O_2$—(or $O_3$—)bubbling;

drying the hydrate and then baking the hydrate in an air at temperatures ranging from 1000 to 1400° C.; and baking the hydrate in a reducing atmosphere at temperatures ranging from 1000 to 1400° C.

* * * * *

UNITED STATES PATENT AND TRADEMARK OFFICE
CERTIFICATE OF CORRECTION

PATENT NO. : 6,939,480 B2
DATED : September 6, 2005
INVENTOR(S) : Masaki Aoki et al.

It is certified that error appears in the above-identified patent and that said Letters Patent is hereby corrected as shown below:

Drawings,
Delete Sheet 5.

Column 23,
Line 2, replace "0.1, to 3.0" with -- 0.1 to 3.0 --.

Signed and Sealed this

Seventh Day of March, 2006

JON W. DUDAS
*Director of the United States Patent and Trademark Office*